US005682303A

United States Patent [19]
Goad

[11] Patent Number: 5,682,303
[45] Date of Patent: Oct. 28, 1997

[54] RECONFIGURABLE THIN-PROFILE SWITCHED-MODE POWER CONVERSION ARRAY AND METHOD OF OPERATING THE SAME

[75] Inventor: Stephen D. Goad, Tuscon, Ariz.

[73] Assignee: International PowerSystems, Tucson, Ariz.

[21] Appl. No.: 654,135

[22] Filed: May 28, 1996

Related U.S. Application Data

[63] Continuation-in-part of Ser. No. 164,097, Dec. 8, 1993, Pat. No. 5,563,780.

[51] Int. Cl.$^6$ .................................................. H02M 3/00
[52] U.S. Cl. .................. 363/71; 363/20; 363/40; 307/82
[58] Field of Search ....................... 363/71.4, 16.65, 363/17.39, 20–26, 131–134, 143; 307/82; 323/271, 272

[56] References Cited

U.S. PATENT DOCUMENTS

| D. 297,928 | 10/1988 | Harpley | D13/4 |
|---|---|---|---|
| 3,949,382 | 4/1976 | Yasui | 340/173 R |
| 4,290,101 | 9/1981 | Hergenhan | 363/65 |
| 4,665,357 | 5/1987 | Herbert | 323/361 |
| 4,685,039 | 8/1987 | Inou et al. | 363/16 |
| 4,730,241 | 3/1988 | Takaya | 363/19 |
| 4,949,084 | 8/1990 | Schwartz et al. | 340/825.83 |
| 4,972,292 | 11/1990 | Peterson | 361/56 |
| 5,105,351 | 4/1992 | Harada et al. | 363/65 |
| 5,121,315 | 6/1992 | Moriya | 363/65 |
| 5,311,053 | 5/1994 | Law et al. | 257/529 |
| 5,365,407 | 11/1994 | Nakabayashi et al. | 361/794 |
| 5,369,564 | 11/1994 | Choi | 363/71 |
| 5,400,262 | 3/1995 | Mohsen | 364/489 |
| 5,428,523 | 6/1995 | McDonnal | 363/71 |
| 5,563,780 | 10/1996 | Goad | 363/71 |

OTHER PUBLICATIONS

Lambda Electronics, Inc. trade literature, entitled "The Broadest Range of Power Modules In The Industry", dated Feb. 1996, pp. 1–32.
Vicor Corporation trade literature, entitled "Vicor Express", dated 1995, pp. 1–15.

Primary Examiner—Adolf Berhane
Attorney, Agent, or Firm—Duane, Morris & Heckscher

[57] ABSTRACT

A high-power, switched-mode power conversion array having an input capacitance, an output capacitance, and a multiple, reconfigurable converter cells. Each of the converter cells convert an input voltage to an output voltage using switched-mode power conversion. The converter cells operate at a conversion frequency and are phase-shifted across one conversion period, so that each converter is switched ON in a time-overlapping relationship with at least one other one of the plurality of converters. As a result, the input and output current and the voltage ripple are substantially reduced, the ripple frequency of the array is increased, and the power capacity is increased. The converter cells can have a selectable conversion frequency, and thus, a selectable period. The apparatus also can include a programmable interconnection network selectably and reconfigurably connecting each cell to at least one other cell, an input node, or an output node, using serial or parallel connections. The programmable interconnection network can consist of an interconnection switch array, that include programmable elements. Selected programmable elements are connected with respective ones of the plurality of converter cells. The array can be dynamically-adaptive and be reconfigured to adapt to the preselected criterion on-the-fly. The array can also be a thin-profile array having an array aspect ratio of greater than 30.

15 Claims, 12 Drawing Sheets

RECONFIGURABLE THIN-PROFILE SWITCHED-MODE POWER CONVERSION ARRAY AND METHOD OF OPERATING THE SAME

RELATED APPLICATION

This is a continuation-in-part of U.S. patent application Ser. No. 08/164,097, filed Dec. 8, 1993 now U.S. Pat. No. 5,563,780.

BACKGROUND OF THE INVENTION

1. Field of the Invention

The invention relates to the field of switched-mode power converters and, in particular, to a higher power, DC-to-DC converter utilizing a phased array of lower power converters operating in parallel.

2. Description of the Relevant Art

Switched-mode power converters accomplish various forms of power conversion through systematic switching and storage of electrical energy. A wide variety of circuit topologies are used to address different power conversion requirements and applications. The regulation of the power conversion process is generally implemented through the control of one or more active switching devices.

Many circuit topologies used in DC-to-DC switched-mode power converter technology use a control technique which monitors and samples one or more critical operating parameters, processes this quantified information, and produces a single output which is used to drive a single active-power switching device or several power switching devices which are connected in series, or in parallel. There also are several different topologies which use two control outputs to drive two or four active power switching devices.

Switched-mode power conversion is commonly used because it generally is more efficient than linear regulation, which dissipates unused power as a primary method for regulation. Theoretically, if the switches and energy storage elements were lossless, that is, lossless inductors and capacitors, switched-mode power conversion would be 100-percent efficient. In reality, because components are not ideal and do exhibit loss, the efficiency is less than 100 percent, typically in the range of 75 to 95 percent, depending on the circuit topology and the application.

Switched-mode power conversion also is commonly used because, as the switching frequency increases, the size and weight of the converter typically are reduced, primarily due to the frequency-scaling properties of the energy's storage components.

One inherent shortcoming of switched-mode power conversion becomes apparent in applications requiring smaller converter sizes and higher switching frequencies. The smaller-size requirements frequently dictate that the switching frequency of the converter be increased dramatically. Often, the increase in frequency goes beyond the efficient operating range of the components available. Consequently, parasitic effects begin to dominate and losses increase, which cause a reduction in the conversion efficiency and a significant increase in the complexity of the circuit design. This relationship between size and frequency ultimately can limit the size and efficiency of switched-mode power converters.

Size and frequency limitations can become even more significant as power level increases because the components required to convert the higher power levels generally are larger and exhibit a higher degree of parasitic effects, efficiency losses, and nonideal behavior. In addition, these effects usually occur at lower frequencies, for example, when the size of the components increase. Therefore, it can be more difficult to increase the switching frequency when the amount of power which must be converted increases.

Another problem which can arise from the reduction in size and increase in frequency is the creation of high operating temperatures and hot spots due to the lumped nature of the circuit topologies, and because a reduction in size is not necessarily accompanied by a corresponding reduction in losses or increases in efficiency. Therefore, heat removal can be a significant problem. Indeed, high-power, small-package-size, i.e., high-density, converters frequently require external cooling devices to reduce operating temperatures and lessen the deleterious effects of hot spots. Often, while attempting to minimize the physical size of a converter, the power density can exceed 5 W/in$^3$, which may lead to excessive temperatures and heat retention in the volumetric core of the device.

Suitable cooling devices can include radiative devices, such as externally-applied heat sinks, and forced-convection devices, including fans and blower assemblies, or both. Such cooling schemes can substantially increase the cost, complexity, size, reliability, and auxiliary power requirements for the overall system, thus diverting resources from the primary application. Ultimately, higher operating temperatures result in diminished converter reliability and operational life. Also, a cooling subsystem failure, e.g., a fan malfunction, can trigger a catastrophic failure of the power converter and, thus, the primary application.

The use of parallel phase-shifted DC-to-DC converters is known in the art. See Hergenhan, "N Phase Digital Converter," U.S. Pat. No. 4,290,101 (1981). However, in Hergenhan, the control circuit separately provides a sequential triggering pulse to each of the power switches, in a manner to provide nonoverlapping control pulses as depicted in Hergenhan's FIG. 2.

The switching of flyback transformers for lowering RMS values of ripple current through the input and output capacitors of a power conversion circuit, is shown in Petersen, "Inductor with Centertap Switching Transistor for Reduced Radio Frequency Emissions," U.S. Pat. No. 4,972,292 (1990). Petersen, however, describes a four-switch array in which each of the switches are driven 90-degrees out-of-phase with respect to each other in a nonoverlapping relationship with varying duty cycles as shown in lines A and B of Peterson's FIG. 2a.

A parallel array of frequency converters for an AC power source is shown by Harada et al., "X-Ray Power Supply with Plural Frequency Converters," U.S. Pat. No. 5,105,351 (1992). However, although the primary coils of the switched transformers are in parallel, their secondary output circuits are permanently ganged in a series to boost the DC output voltage.

Inou et al., "DC/DC Converter," U.S. Pat. No. 4,685,039 (1987), describes a DC-to-DC converter having switched primaries coupled in series, and secondary circuits coupled in parallel, to the output capacitance and load. The embodiment of FIG. 7b of Inou shows three such circuits coupled in parallel between the input and output capacitances. Switching of the primary circuit in each circuit can be either simultaneous, as shown by Inou's FIG. 4a, or 180-degrees out-of-phase, as shown in FIG. 4b. Beyond these two modes, sequential phase-shifting among a plurality of switched primaries is not considered in Inou.

Some existing designs employ a single transformer. However, as the power requirements increase, so does the volume and heat production of the transformer. One single-transformer design attempts to reduce the profile of the transformer by laminating alternating layers of conductors and insulators in a printed-circuit-board-like arrangement. This DC-DC converter, i.e., U.S. Pat. No. 4,730,241 to Takaya, requires a "relatively large volume," and remains limited by ripple and heating effects experienced by other single-transformer designs and does not provide multiple outputs.

Other designs employ multiple, phase-shifted, interdependent magnetic elements that cooperate to behave as a single transformer. One such device is described in U.S. Pat. No. 4,665,357 to Herbert. Although some improvement in heat dissipation can be obtained, the single-transformer design tends to produce a substantial ripple in the output power. Furthermore, because the magnetic elements are interdependent, the design does not permit adaptivity, redundancy, or reconfigurability, and no provision is made for multiple output voltages or current paths. Yet other power converter designs, such as U.S. Pat. No. 5,365,407 to Nakabayashi et al., may provide for multiple output voltages but are not thin-profile, adaptive, reconfigurable, or redundant.

Therefore, what is needed is a switched-mode power converter topology and methodology by which each of the aforementioned shortcomings, particularly in higher power applications, are minimized or eliminated. Specifically, what is needed is a switched-mode power converter that is reconfigurable, preferably adaptively reconfigurable, and redundant, or that has a thin-profile configuration providing improved heat dissipation, or both.

SUMMARY OF THE INVENTION

What is described below is a high-power, switched-mode power converter array, derived from many lower-powered converter cells which are combined to overcome the shortcomings arising from size and frequency limitations. More specifically, a plurality of lower-powered converter cells are combined such that the currents flowing in the input and output capacitances in the individual converter cells are reduced. An array of lower-power converter cells exhibit many of the benefits of high-frequency operation with each individual converter cell in the array operating at a much lower frequency. A lower operating frequency allows the use of common, inexpensive components that generally operate more efficiently within their optimum operating ranges, and exhibit fewer nonideal or parasitic effects. This technique becomes more attractive at higher power levels because of the distribution in the array of the high power among multiple lower-power converter cells. The power distribution also serves to spread the losses substantially evenly and avoids hot spots which are typically encountered in large, lumped components.

More particularly, one apparatus embodiment of the invention herein is a power conversion array having an input capacitance, an output capacitance, and a reconfigurable plurality of converter cells. Each converter cell has an input coupled to the input capacitance and an output coupled to the output capacitance. In certain embodiments of the invention, the input and output coupling is preferred to be a parallel coupling. Each of the converter cells convert an input voltage to an output voltage using switched-mode power conversion. The plurality of converter cells operate at a conversion frequency and are phase-shifted across one period of the conversion frequency, so that each converter is switched ON in a time-overlapping relationship with at least one other one of the plurality of converters. As a result, the input and output current, and the voltage ripple, are substantially reduced, the ripple frequency of the array is increased, and the power capacity is increased. The converter cells can have a selectable conversion frequency, and thus, a selectable period.

The apparatus also can include a programmable interconnection network selectably and reconfigurably connecting each of the cells to at least one other cell, an input node, or an output node. Each connection can be a serial or a parallel connection, or the cell may be disconnected and thereby electrically isolated. The programmable interconnection network can consist of an interconnection switch array, and an interconnection switch connector. It is preferred that the interconnection switch array include a plurality of programmable elements with selected programmable elements being connected with respective ones of the plurality of converter cells. The interconnection switch controller is connected to the array of programmable elements, and selectively programs the switches, responsive to a preselected criterion. Such a criterion can include a preselected power output profile, a user configuration, or a primary application signal.

The network can be an adaptive interconnection network in that the switch array configuration can be altered to adapt to changing values of the preselected criterion. Indeed, the network can be a dynamically-adaptive interconnection network in which the array can be reconfigured to adapt to the preselected criterion on-the-fly, i.e., during array operation. The preselected power output profile can include output voltage or current. The profile also can include a selectable predetermined power output path, i.e., input power can be selected from any given input node and converted as needed, with the output power being directed to any given output node.

Certain embodiments of the invention herein are preferred to have an array of converter cells that are arranged in a thin-profile configuration having a dimensionless array aspect ratio of at least 30. The thin-profile configuration can substantially increase the heat dissipation of the array, thereby reducing, if not eliminating, the need for external cooling devices. The thin-profile configuration can be beneficially applied to power converter arrays, including those arrays with a nominal output power of between about 100 watts and about 5000 watts, although the configuration is not limited to this range. The array aspect ratio of some embodiments can be substantially higher than 30, for example at least 60, and can be used in arrays having a nominal output power of at least 500 watts. Indeed, in one particular embodiment of the thin-profile, high-power conversion array of the invention, the array is capable of providing a nominal output power of about 800 watts while arranged to have an array aspect ratio of about 80. In a most particular embodiment of the power conversion array of the invention, it is preferred to provide a dynamically-adaptive, reconfigurable, and redundant power converter cell array.

In one illustrated embodiment, the plurality of converter cells are phase-shifted, one from the other, substantially uniformly across the period. The plurality of converter cells can include an array controller for sequentially phase-shifting the plurality of converter cells across the period. The plurality of converter cells are N in number and the frequency of operation of each of the converters has a period T. Each of the plurality of converters is phase-shifted from each other by a time increment of about T/N. Each of the plurality of converter cells is switched ON for a time period of $T_{on}$. Also, the converter cells can have a preselected circuit topology.

The power conversion array further can include a clock. The clock generates a clock signal at the frequency of operation of the plurality of converter cells. The clock is coupled to the control circuit. The array controller provides a regulated control pulse to a delay circuit. The delay circuit generates a plurality of sequentially-delayed switching pulses. The delay circuit is coupled to each of the converter cells to sequentially switch the converter cells with the switching pulses.

The delay circuit can include a plurality of delay line modules coupled together in series. Each delay line module can provide a delayed trigger to initiate a next one of the delay line modules. Each delay line module, in turn, generates a plurality of delayed trigger signals. The delay line modules are coupled to selected ones of the plurality of converter cells to provide the phase-delayed switched-mode operation of the converter cells.

The delay line module can include a multiple-tap delay line circuit, and the delay circuit includes a corresponding plurality of multiple line drivers. Each of the drivers is coupled to a corresponding multiple of the converter cells to drive the converter cells ON and OFF in response to the delayed trigger provided to the delay circuit.

In one embodiment of the invention herein, it is preferred that the regulated control pulse generated by the array controller is a pulse-width-modulated signal.

The invention also is characterized as a method of adaptively providing the switched-mode power conversion between an input capacitance and an output capacitance. The method includes the steps of providing an input power waveform, and sequentially coupling the input power waveform through a plurality of switched-mode converter cells having a preselected circuit topology. The sequential coupling is reconfigurable in that any one of the plurality of converters can be coupled, in parallel or in series, with one or more other converters between the input and output capacitances, in response to a preselected criterion. The sequential coupling can be dynamically-adaptive wherein the sequential coupling is varied to adapt the power output profile to the preselected criterion on-the-fly. The input power waveform is switched with a conversion frequency having a period and is sequentially-coupled through each of the plurality of switched mode converter cells by predetermined phase-shifts of operation of each converter cell within the period in an at least partially time-overlapping relationship. As before, both conversion frequency and period can be selectable. The preselected criterion can include one of a user configuration, a primary application input signal, and a preselected output power profile. An output power waveform is provided at the output capacitance coupled with the outputs of the plurality of converter cells. As a result, high-power operation at high frequency is obtained without the typical frequency, size, and temperature limitations.

The method further can include the step of regulating each of the switched-mode converter cells to provide a predetermined profile for the output power waveform. In addition, the step of regulating can include adaptively reconfiguring the architecture of the converter array, also to provide predetermined power output waveform. The power output profile can include at least one of a preselected power output waveform voltage, a preselected power output waveform current, and an output waveform flow path.

The step of sequentially coupling the input power waveform through the plurality of switched mode converters includes the steps of generating a plurality of switching signals through a cascaded delay, and switching each of the plurality of switched-mode converters with a corresponding one of the switching signals.

In the step of sequentially coupling the input power waveform through the plurality of switched mode converters, the plurality of converters can be operated in a time-overlapping sequential series, so that at least two of the converters provide an output to the output capacitance at a time.

The invention further is characterized as a method of providing switched-mode power conversion of an input power waveform, including the step of sequentially coupling the input power waveform through a plurality of power converter cells arranged in a thin-profile configuration having an aspect array ratio of at least 30, thereby providing a substantially increased heat dissipation. Such method easily can produce a nominal output power waveform of between about 100 watts and about 5000 watts in the array. In certain embodiments of the method, the sequential coupling through the plurality of cells having an aspect ratio of at least 60 can provide a nominal output power signal of at least 500 watts.

The invention may now be better visualized by turning to the following drawings wherein like elements are referenced by like numerals.

The invention and its various embodiments may now be understood in relationship to the following detailed description.

DESCRIPTION OF THE PREFERRED EMBODIMENTS

Decreased input and output ripple current, and ripple voltage, on a switched-mode power conversion array can be realized at high power levels and frequencies by coupling an input power waveform across an input capacitance to which a plurality of smaller power converter circuits, or cells are coupled. The converter cell circuits may have any topology now known or later devised. Each of the converter cell circuits can be sequentially-operated in a phase-shifted manner across the period of the conversion frequency in a time-overlapping relationship. For example, if there are N converter cells and the period of the conversion frequency is T, each converter cell circuit is triggered or switched at a phase shift corresponding to a time increment of about T/N, delayed with respect to the preceding or subsequent converter. The output of each of the converters then is coupled to an output capacitance. The operation of the converters may each be regulated in any manner now known, or later devised and are shown in the illustrated embodiment as being pulse-width-modulated to provide a regulated output. Alternatively, the conversion frequency, and thus the conversion period, can be selectable and be a preselected conversion frequency and conversion period.

Figure 1:
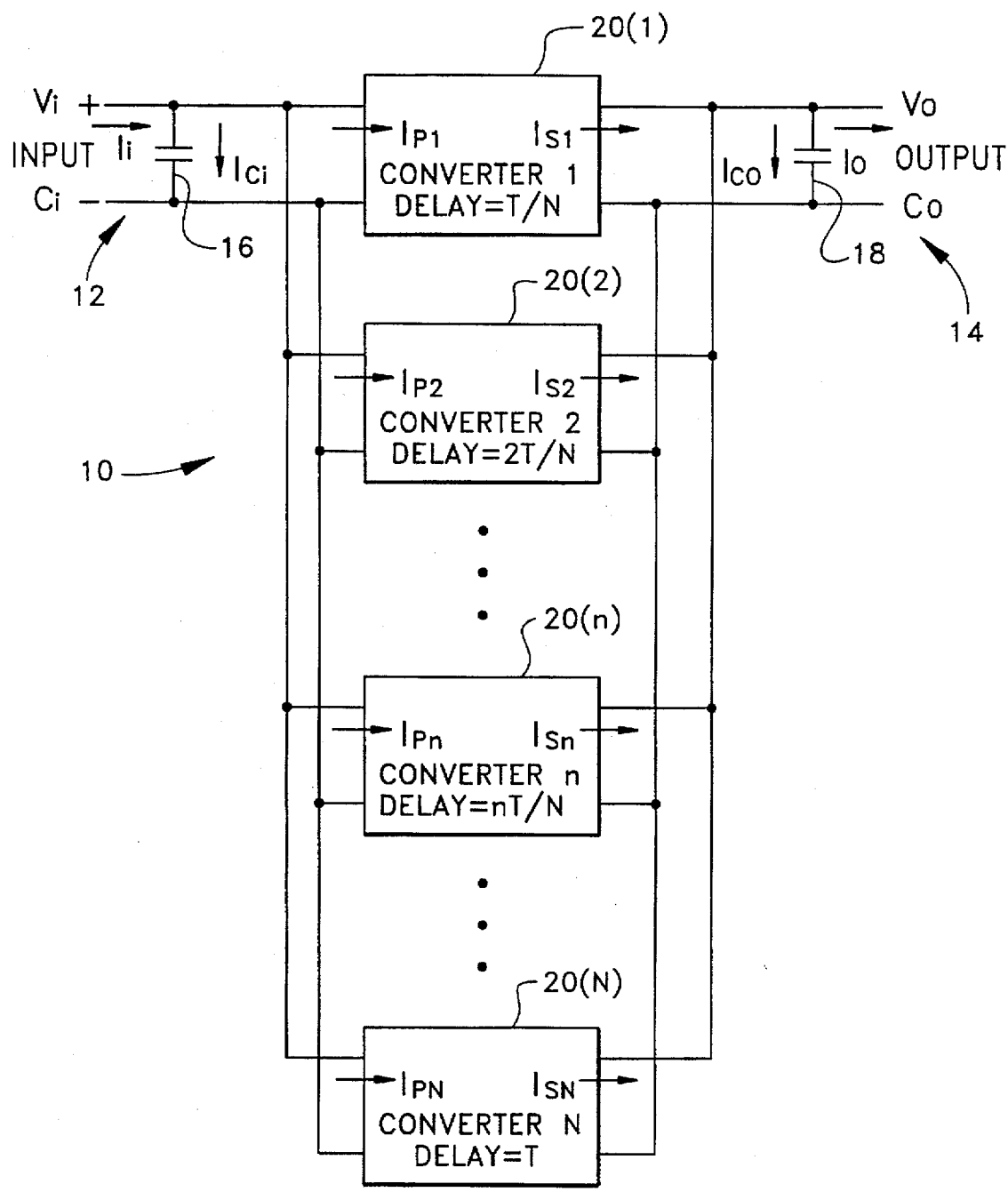
FIG. 1 is a block diagram of an N-phased switched-mode power converter array organized according to the invention.

FIG. 1 illustrates a simplified block diagram of an N-phase, switched-mode, power converter array organized according to the invention. An input voltage $V_i$ is provided at the double-railed input 12 and an output voltage $V_o$ is produced at the double-railed output 14. Voltages $V_i$ and $V_o$ are either DC or slowly varying, as compared to the switching frequency within converter 10. The input current at input 12 is $I_i$ and the output current at output 14 is $I_o$. The input and output capacitances of converter array 10 are schematically depicted as input capacitance 16 $C_i$, and output 18, $C_o$. The input and output capacitance 16 and 18, respectively, are used to stabilize the input and output voltages to accept the high-frequency switching currents of the N converters, 20(1)–20(N), which are used to form power processing array 10.

The input and output switching currents of converters 20(n) are denoted in FIG. 1 as the current $I_{pn}$ and $I_{sn}$, respectively, where n=1, 2 ... N. Converter cells 20(n) are each sequentially-time-delayed or phase-shifted by an interval T/N with respect to the preceding converter cell 20(n−1) in array 10, so that the switching and storage of energy is spread evenly over the switching period, T.

Figure 4:
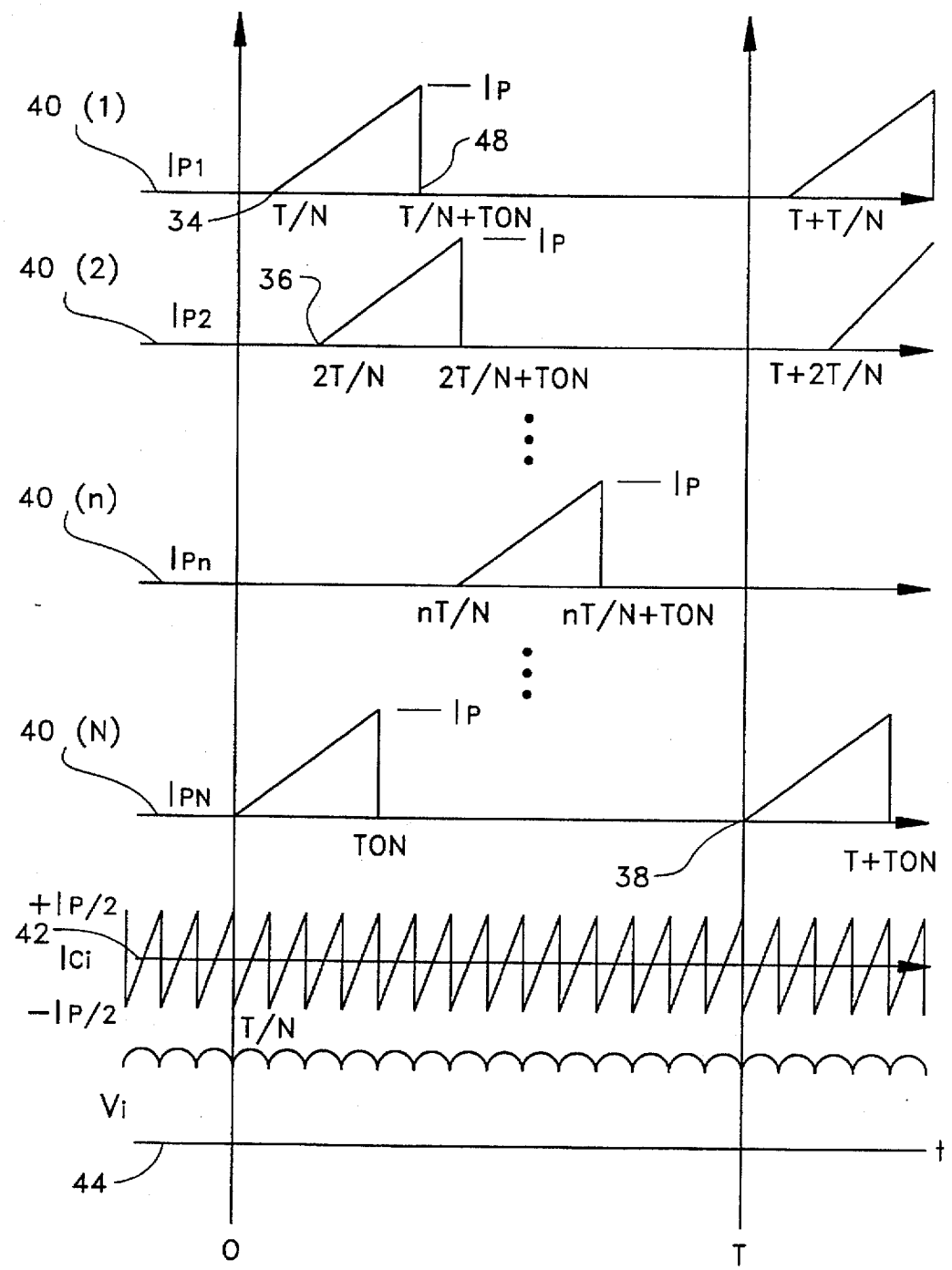
FIG. 4 is a timing diagram showing the current waveforms in the primaries of the transformers depicted in FIG. 2.
Figure 5:
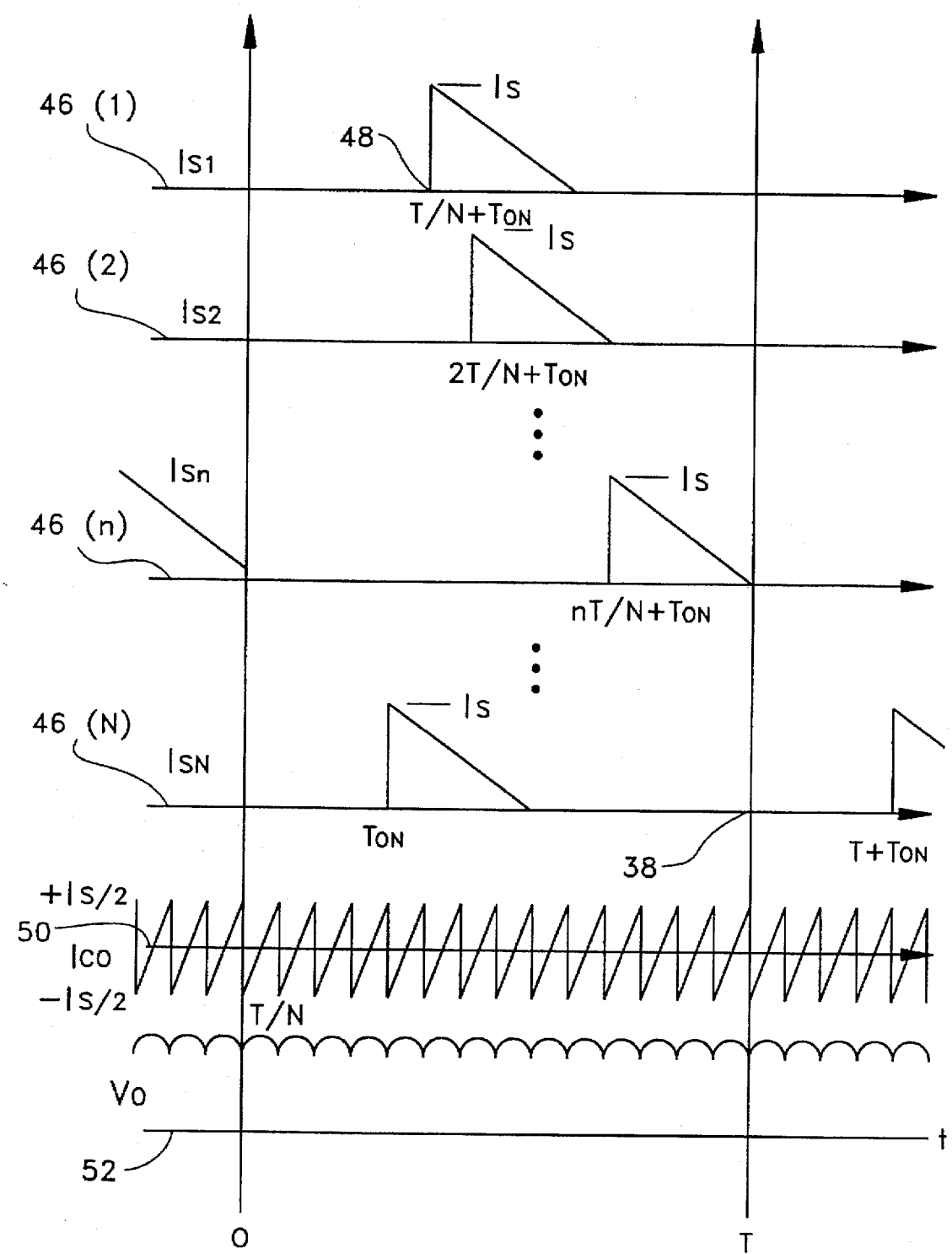
FIG. 5 is a timing diagram showing the current waveforms in the secondaries of the transformers depicted in FIG. 2.

In comparison to the case of a single converter or multiple in-phase converters, the resulting input and output ripple currents, $I_{ci}$ and $I_{co}$ shown in FIGS. 4 and 5, respectively, are significantly reduced and periodic with a period to T/N. The corresponding ripple voltage appearing across capacitances 16 and 18 are reduced even more significantly, as a result of both the reduced ripple currents and increased frequency. It can be shown mathematically that reduction of input and output capacitance ripple currents and voltages apply to any physically-realizable switched-mode power converter circuit topology. The degree of reduction can be a function of converter cell input and output currents, $I_{pn}$ and $I_{sn}$, and the number, N, of converter cells utilized in array 10. In general, the reductions are more significant as the number of converter cells, N, increases, and as the AC component of the converter currents increase relative to the DC component.

Figure 2:
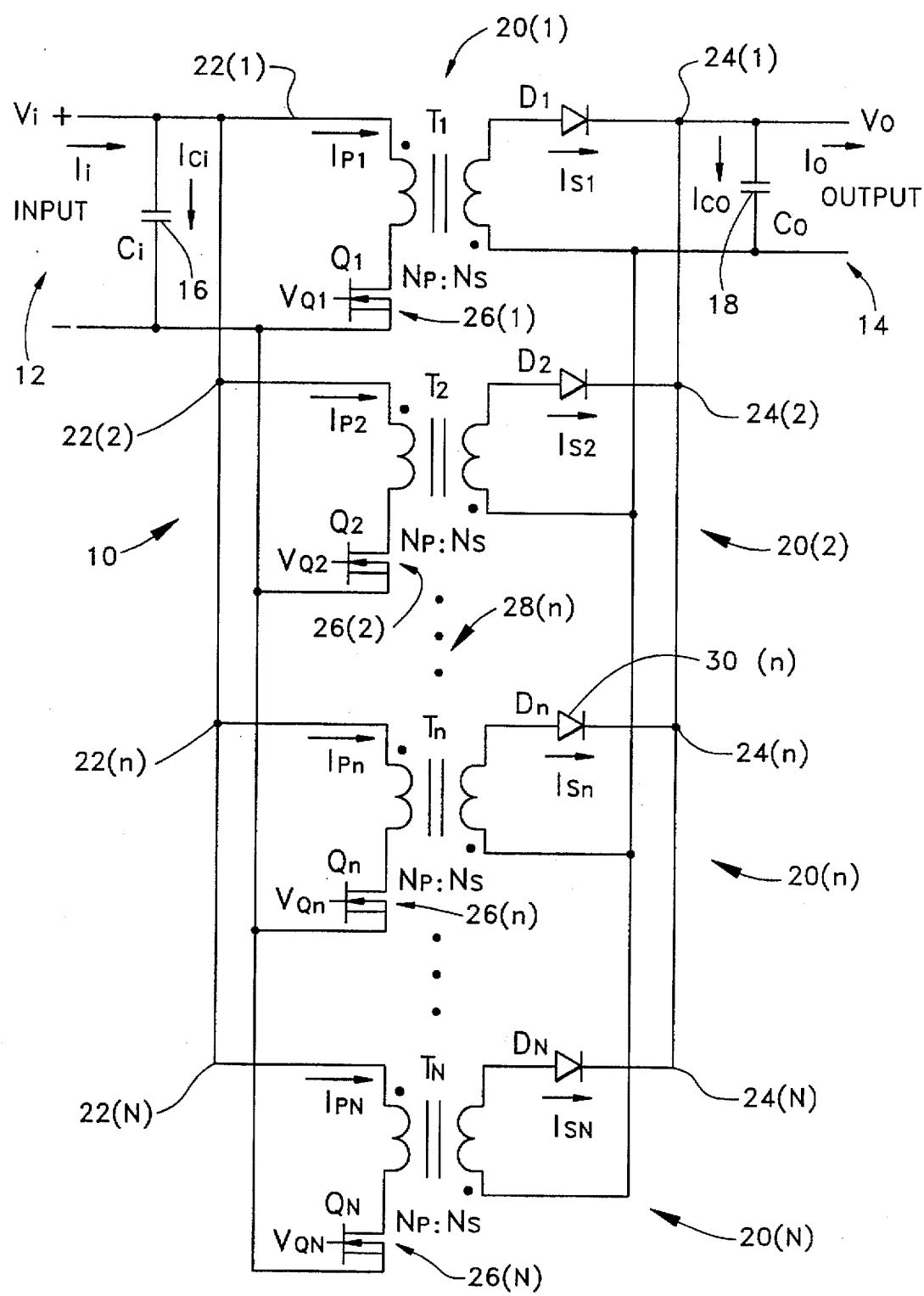
FIG. 2 is simplified and idealized schematic of one embodiment more specifically illustrating the switched-mode power converter array of FIG. 1.

Consider one specific example of the circuit topology of FIG. 1, as shown in the simplified schematic of FIG. 2. The schematic of FIG. 2 shows a phased array of N identical switched-mode power converter cells 20(1)–(N) utilizing a flyback topology and operating in a discontinuous conduction mode. However, any other type of converter topologies may be used without departing from the spirit and scope of the invention. Inputs 22(1)–(N) and outputs 24(1)–(N) of converter cells 20(1)–(N) respectively are coupled in parallel to form a single input 12 and output 14 for the overall combined converter array 10.

Consider, for example, converter cell 20(n). Each converter cell 20(n) has an active switch 26(n) which are shown in the illustrated embodiment as MOSFETs, but any suitable active switch can be used. Switch 26(n) switches current through transformer 28(n), $T_n$. The output of transformer 28(n) is coupled through a diode 30(n). Transformers 28(n) have NP primary turns and NS secondary turns. For the ease of discussion, it is assumed that all components are ideal and lossless, although this certainly is not a necessary condition for the circuitry of the invention.

Figure 3:
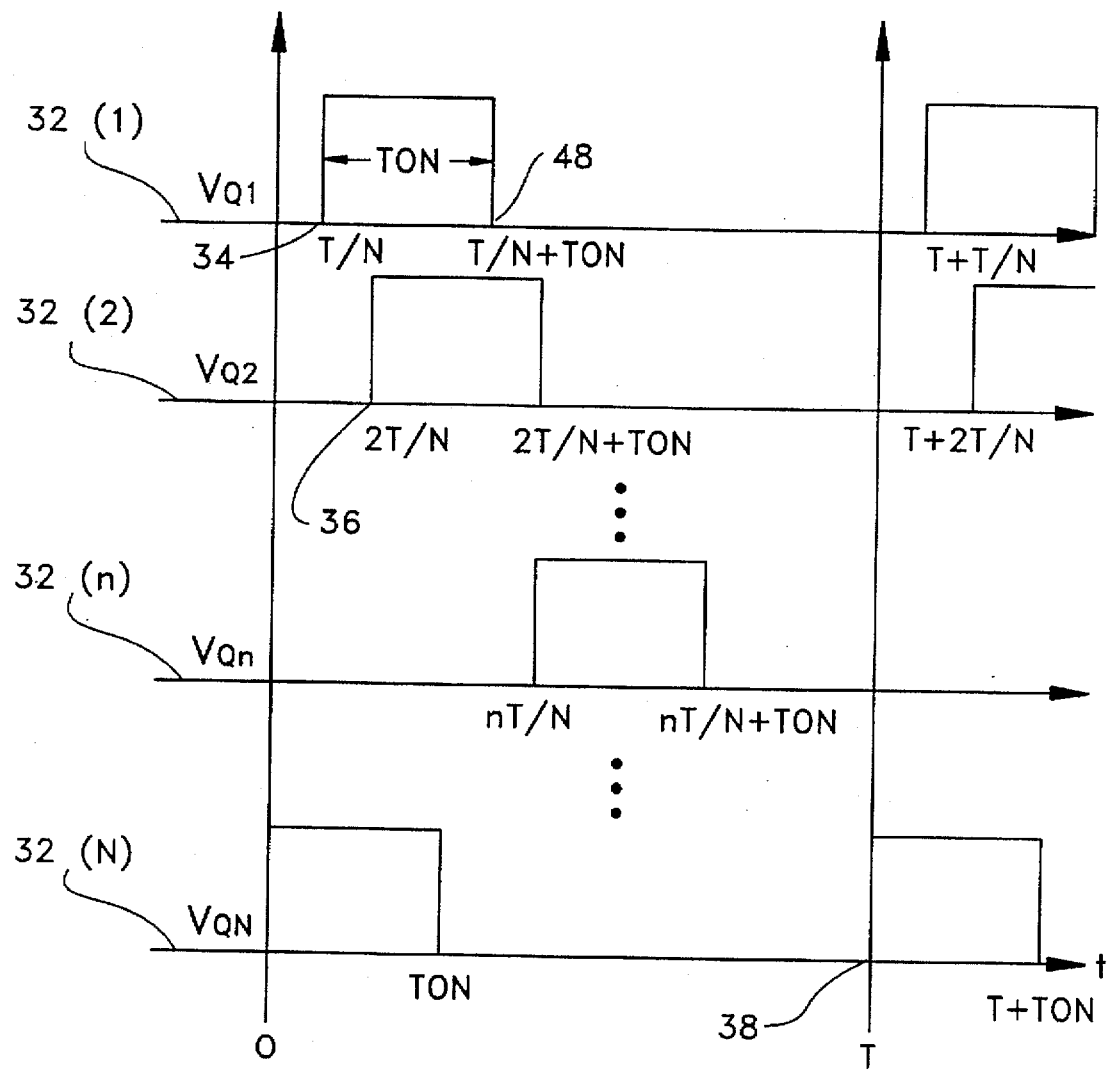
FIG. 3 is timing diagram showing the waveforms for the drive signals applied to the gates of the switching devices in FIG. 2.

Primary switches 26(n), $Q_n$, can be driven by separate drive signals as depicted in the timing waveform diagram of FIG. 3. The horizontal axis represents time and the vertical axis represents voltage, which, on lines 32(1)–(N), correspond to the voltage applied to the gate of each of the switches 26(1)–(N), respectively. The drive pulse for first switch 26(1) begins at an arbitrarily chosen time 34, t=T/N, with a pulse width of $T_{on}$. The drive pulse shown on line 32(2) of FIG. 3 for the second active switch 26(2) of converter cell 20(2) is essentially identical to the drive signal provided to the first switch on line 32(1) except that it is delayed or phase shifted by a time of T/N and, thus, begins at a time 36 of 2T/N.

The drive pulses on the remaining switches 26(n), shown on lines 32(n) in FIG. 3, also are essentially identical to pulse ON line 32(1), except that each is successively delayed by an additional time increment, T/N, from the preceding switch. The last drive pulse on line 32(N) driving switch 26(N) of converter cell 20(N) is, therefore, delayed by total time increment of (N−1) T/N with respect to the initial timing point 34 and thus, actually begins at the next time period 38, as shown in FIG. 3.

This phase-shift of the driving signals results in an overall converter energy processing frequency, i.e. conversion frequency, of about N/T, which is N times the operating frequency of each individual converter cell. Note that only one unique drive signal is provided throughout converter array 10, which drive signal is pulse-width-regulated in the illustrated embodiment to control converter array 10. This signal then is internally phase-shifted within converter array 10 to provide the drive for each of the individual converter cells 20(n) in array 10.

Advantages of the circuit of FIG. 2, when driven with the phase-shifted drive signals of FIG. 3, is illustrated in the primary current waveform timing diagram of FIG. 4, and the secondary current waveform timing diagram of FIG. 5. Consider first the timing diagram of FIG. 4. The primary current $I_{pn}$ flows in the phased array of N flyback converters 20(n) as depicted on lines 40(1)–(N) in FIG. 4. Again, time is shown on the horizontal axis, with current depicted on the vertical axis. Primary current, $I_{pn}$, flows in each converter cell 20(n) when its respective drive pulse, $V_{qn}$, is high. The current ramps-up approximately linearly to a peak current, $I_p$, according to the input voltage, $V_i$, the primary inductance of transformer 28(n), $T_n$, and the conduction time, $T_{on}$. The conduction times are all equal to $T_{on}$, corresponding to the identical pulse width of the drive pulses. The total input current to the converter array 10, $I_i$, is equal to the sum of the DC components of all the converter cell primary currents, $I_{pn}$. The input capacitor ripple current, $I_{ci}$, is equal to the total input current minus the sum of all the converter primary currents, $I_{pn}$. Note that the peak-to-peak current is only equal to $I_p$, which is essentially the same for each converter cell 20(n). If all of converter cells 20(n) were switched in-phase, or if they were replaced by a single converter, this peak-to-peak input capacitor ripple current would be approximately N times larger, i.e. $NI_p$. The phase-shifting of the converter cells 20(n) causes the primary currents to sum in a way that yields a peak-to-peak input capacitor current which is lower by a factor equal to the number of converters, N. A corresponding reduction occurs for the input capacitor RMS ripple current. The magnitude of this reduction is on the order of N. However, it also varies as a function of the conduction time, $T_{on}$. The ripple current, $I_{ci}$, is shown in line 42 of FIG. 4. The frequency of the input capacitor ripple current is thus illustrated as N times the operating frequency of each of the individual converter cells 20(n).

Also shown in FIG. 4 on line 44 is the input ripple voltage which results form the ripple current flowing through input capacitor 16. This voltage consists of the usual DC input component plus an additional AC component caused by the input capacitor ripple current. Simple analysis yields that both the peak-to-peak and RMS input capacitor ripple voltages are lowered by a factor of the order of $N^2$ as compared to the case of a single converter, or when multiple converters are driven in-phase. One factor of N in the reduction results from the reduction in the ripple current itself. The other factor of N in the reduction of the ripple voltage results from the increase in frequency seen at input capacitor 16. The reduction typically occurs regardless of the form of the input waveform and, hence, the topology of the conversion circuit.

FIG. 5 similarly illustrates the current in the secondaries $I_{sn}$ of transformers 28(n). The secondary currents are shown on lines 46(1)–(N) with a secondary current in each converter circuit 20(n) beginning at the turn-off time 48 of the primary current shown in FIG. 4, and ramping-down approximately linearly to about zero. Thus, each secondary current is phase-shifted from the preceding one by the same time increment of T/N. An analog output capacitor ripple current, $I_{co}$, is depicted on line 50 having a frequency N times greater than the frequency of each individual converter. Similarly, an output voltage is shown on line 52 of FIG. 5 with an AC ripple component which is reduced by a factor of the order of $N^2$ compared to a single converter, or a plurality of in-phase converters.

These reductions in input and output capacitor ripple currents and voltages tend to become substantial as N increases. Conversely, for a fixed ripple current and voltage requirement, the amount and quality of input and output capacitance tends to decrease significantly as N increases.

Figure 6:
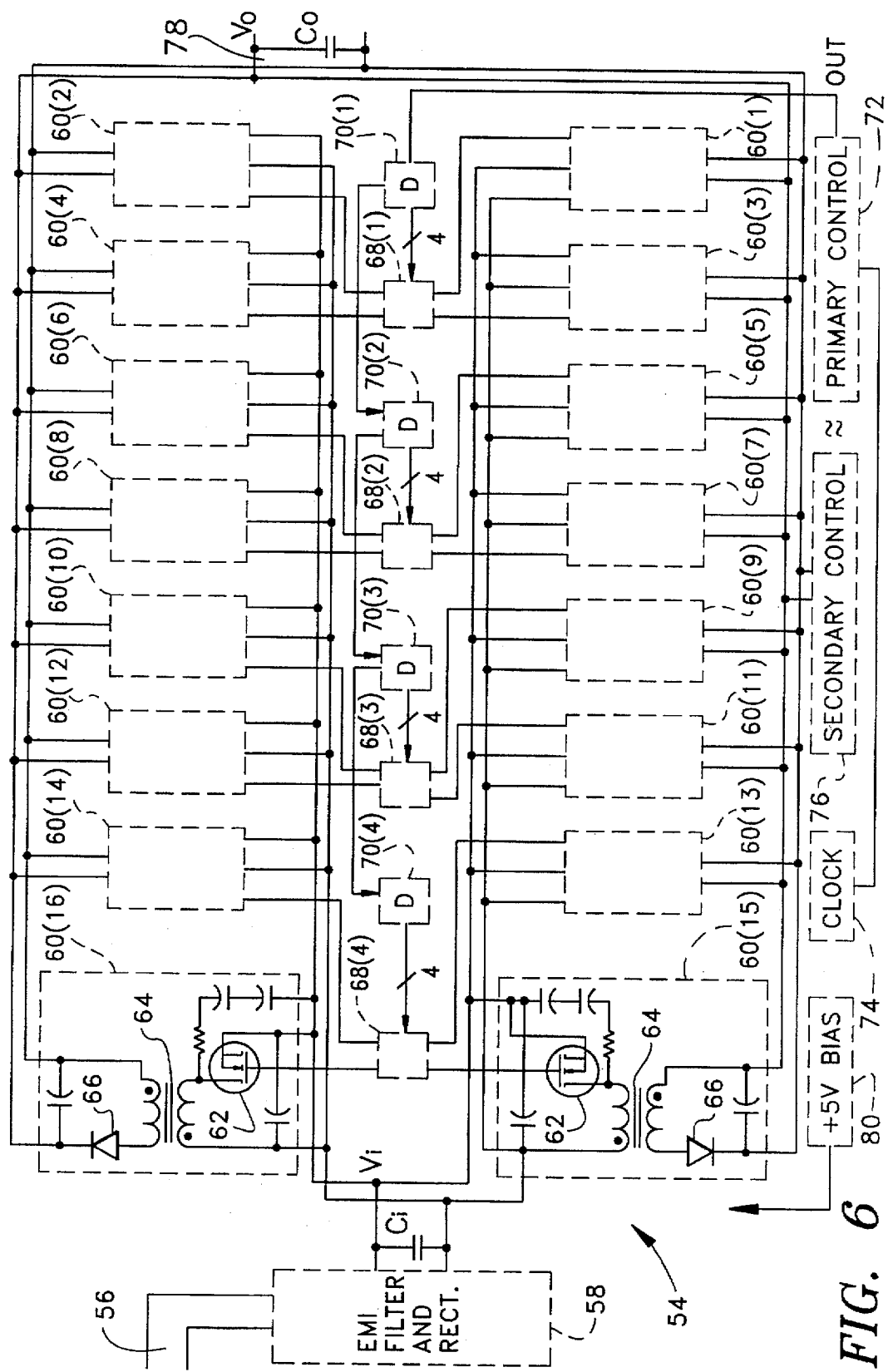
FIG. 6 is a block diagram of a second embodiment of the invention.

FIG. 6 is a block diagram of a second embodiment of the invention wherein a 300-watt isolated power-factor-correction front-end, generally denoted by reference numeral 54, is shown diagrammatically. The input can be input into an electromagnetic interference (EMI) filter and rectifier 58 which filters the EMI and rectifies the AC input. The input can be an AC input, or an at least slowly-varying input 56 as compared to the switching frequency of circuit 54. The filtered DC input is then provided in parallel, for example, to sixteen switched-mode power circuits 60. Each of these power circuits 60 includes a MOSFET switch 62, transformer 64, secondary diode 66, and associated capacitors and resistors, as depicted in FIG. 6. However, those with skill in the art would recognize that any converter cell topology could be used in connection with the present invention, and the one depicted in FIG. 6 is chosen only for concreteness of illustration.

MOSFET switches 62, in turn, are driven by MOSFET drivers 68. In the illustrated embodiment, MOSFET drivers 68 are integrated circuit CMOS quad-drivers, such as, for example, TC4469COE, as manufactured by Telcom Semiconductor, Inc., Mountain View, Calif. Each driver 68 provides the driving signal to the MOSFET switches 62 in four corresponding converters 60.

MOSFET drivers 68, in turn, can be triggered by a sequential chain of delay-line circuits 70, which in the illustrated embodiment, are five-tap delay line circuits. Suitable delay line circuits include the Model No. DS1000S-500 device which is manufactured by Dallas Semiconductor, Inc., Dallas, Tex. The first one of the delay line circuits 70 is controlled by a signal, OUT, provided by a conventional pulse-width-modulated (PWM) primary control circuit 72. PWM primary control circuit 72, in turn, is driven by a clock 74 which divides-down a 5 MHz signal by a factor of 16 to about 312.5 kHz. Thus, pulses are provided from primary control circuit 72 approximately every 3.2 microseconds with a pulse-width as determined by a conventional secondary control circuit 76. Circuit 76 is preferred to be optically-coupled to primary control 72. Secondary control circuit 76 obtains a feedback signal from output 78. Each of delay line circuits 70 effectively provide 200-nanosecond-separated delayed pulses to its corresponding MOSFET driver 68 which, in turn, drives in sequence the four converter circuits 60 coupled to it. For example, delay line circuit 70(1) provides four delay signals having 0, 200, 400, and 600 nanosecond delays, respectively, phase-shifted from the signal OUT to MOSFET driver 68(1). MOSFET driver 68(1), in turn, will sequentially drive converter circuits 60(1)–60(4) to turn ON at 0, 200, 400, and 600 nanoseconds after the trigger signal, OUT. Circuits 60(1)–60(4) stay on for a pulse-width as provided by primary control circuit 72 on the signal OUT. However, by the time that 800 nanoseconds has been reached, second delay line circuit 70(2) will be triggered and will similarly provide four 200-nanosecond delay signals to second MOSFET driver 68(2). In the same manner, converters 60(5)–(8) will also be sequentially-driven "ON" at 200-nanosecond time increments, beginning 800 nanoseconds after initiation of the pulse, OUT, from primary control circuit 72.

In the same manner, all sixteen converter cell circuits 70 will be sequentially driven ON for a time which is determined by the pulse-width generated by primary control circuit 72, during a 3.2-microsecond cycle period which is defined by clock 74. Although in the illustrated embodiment a five-tap delay line 70 is used, another implementation, not explicitly depicted in FIG. 6, can use six such delay line circuits to effectively perform the function of providing the sixteen 200-nanosecond delayed trigger pulses to the respective MOSFET drivers 68 as described in FIG. 6.

The invention this far has been described in connection with two specific topology embodiments but is applicable to any switched-mode power converter circuit topology which converts one level of DC voltage to another level of DC voltage, and which utilizes input and/or output capacitors. The invention, however, is not limited to DC-to-DC converters, but is applicable wherever the input and output voltages vary at a frequency which is slow compared to the operating frequency of the converter, including some DC-AC conversions. An example of this type of application is in a power-factor-correction circuit, where an input voltage varies slowly with line frequency.

The invention is applicable in both fixed-and variable-frequency control techniques, as long as the drives to the array of N converters remain phase-shifted by an increment, such as T/N, as the frequency varies. The invention can be used in both pulse-width-modulated circuitry, as shown in FIG. 6, and in other topologies, including resonant circuit topologies.

Figure 7:
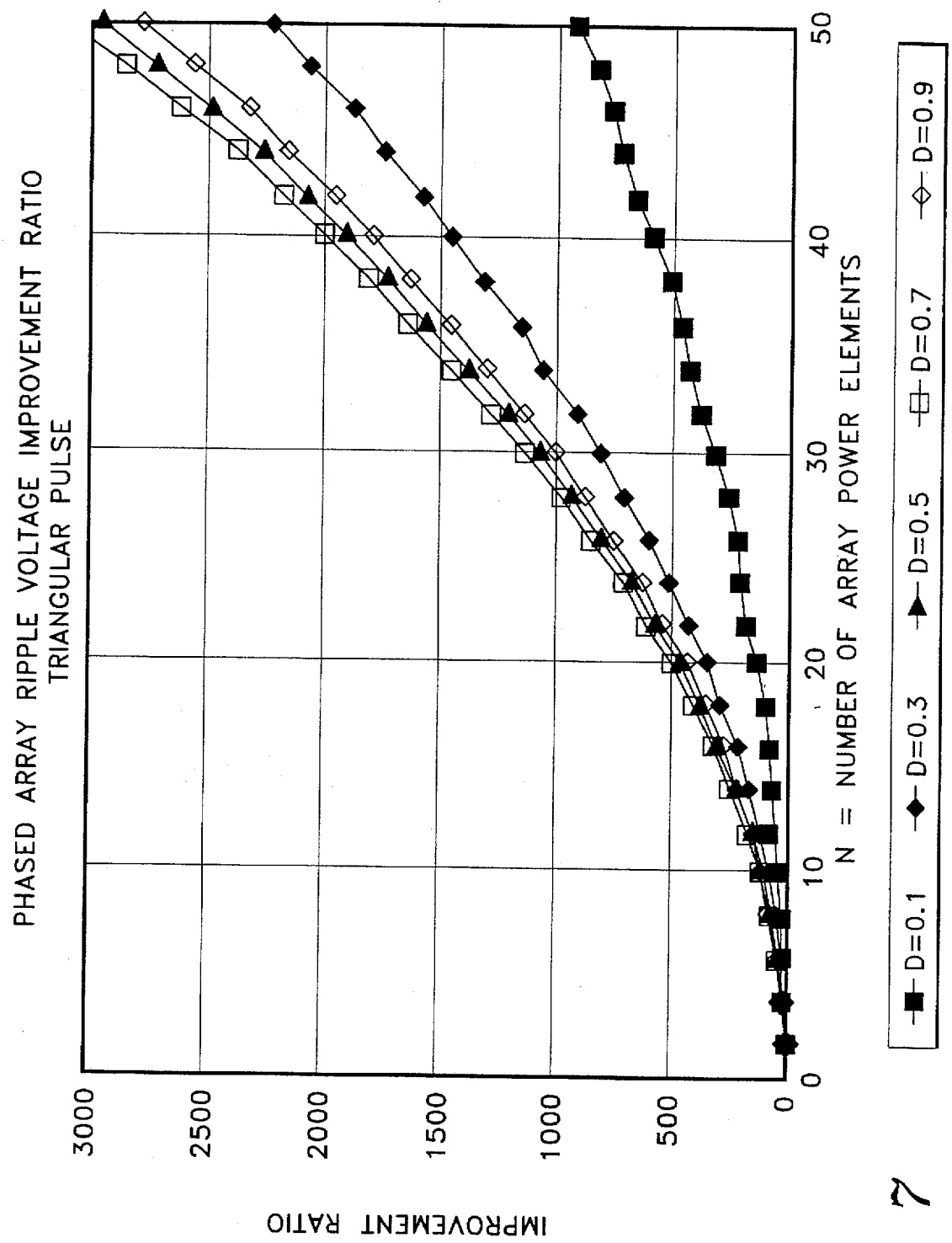
FIG. 7 is a graph of the improvement ratio of AC-voltage ripple form a conversion array of the invention having a triangular output waveform, as compared to the AC ripple from a conversion array in which the same number and type of converters are driven in-phase.
Figure 8:
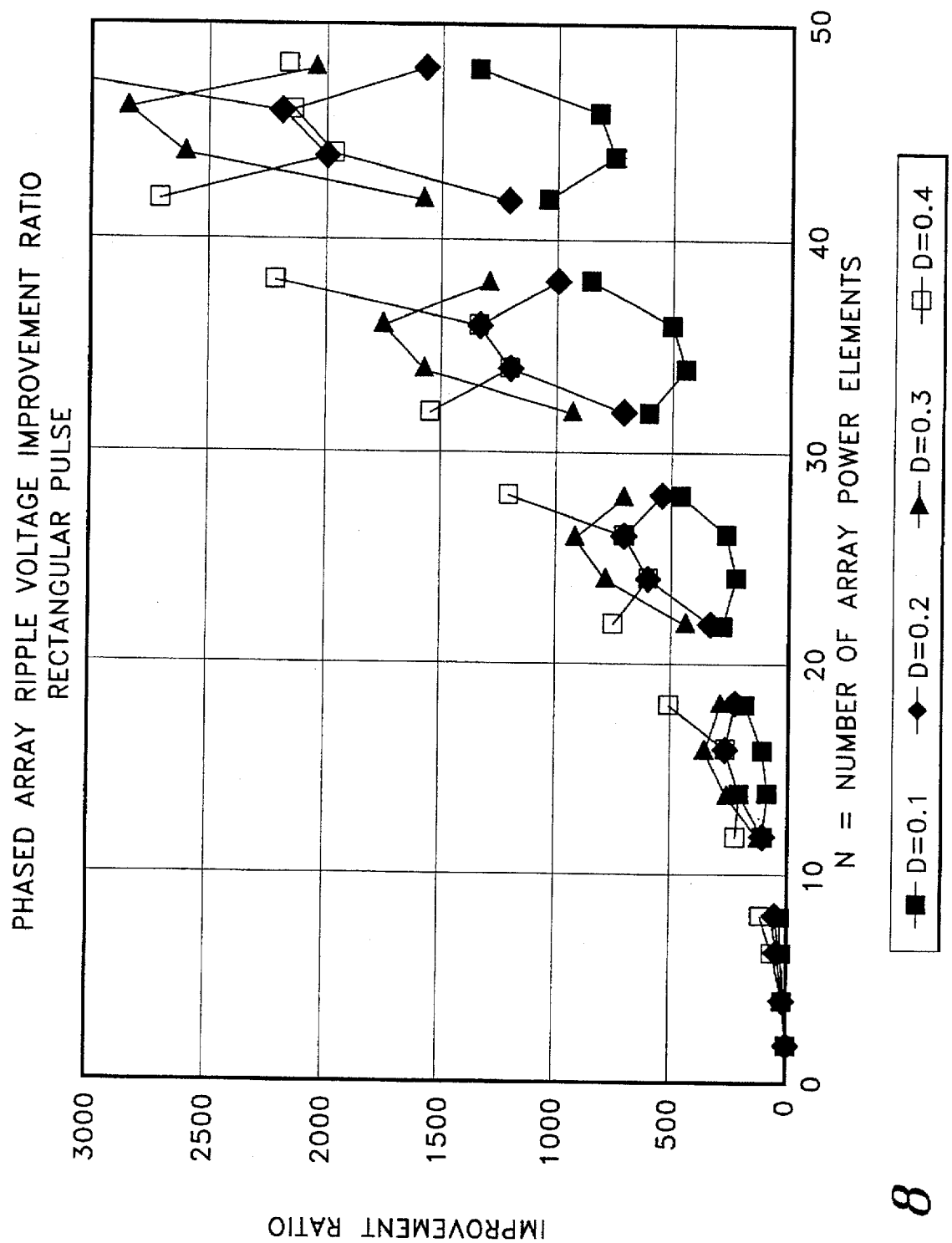
FIG. 8 shows the improvement ratio of AC-voltage ripple in a conversion array of the invention having a rectangular output waveform, as compared to the AC ripple from a conversion array in which the same number and type of converters are driven in phase.

FIG. 7 is a graph of the improvement ratio of AC voltage ripple from conversion array 10 having a triangular output waveform, when driven in a phase-shifted sequence according to the invention, as compared to the AC ripple from a conversion array in which the same number and type of converter cells are driven in-phase, as a function of duty cycle, D, and the number of converter cells in the array. This is defined as the improvement ratio. FIG. 8 shows the improvement ratio of AC voltage ripple in a conversion array having a rectangular output waveform when driven in a phase-shifted sequence according to the invention as compared to the AC ripple from a conversion array in which the same number N and type of converter cells in the array. The reduction in AC current is analogous to that shown for ripple voltage. It is evident from FIGS. 7 and 8, that ripple is reduced as a function of duty cycle, D, the number of converters, N, and the form of the converter output waveform.

In certain embodiments of the invention herein, it is preferred that the power conversion array have a thin-profile configuration with a high array aspect ratio. As used herein, the term array aspect ratio is defined as the ratio of the array planar surface area to the array thickness, further normalized by the cube root of the array volume. That is $$R_A = (WL) \ H^{-1} \ (WLH)^{-\frac{1}{3}}$$

where $R_A$ is the array aspect ratio;

W is the device width;

L is the device length; and

H is the device thickness.

The aspect ratio is thus dimensionally-defined as a unitless figure-of-merit that relates to the efficiency with which heat-loss from the array is transferred to the environment.

As used herein, a "high" array aspect ratio is considered to be at least 30. One key advantage of providing a high aspect ratio to the physical layout of a power conversion array is an increased capacity for heat dissipation due to the large dissipative array planar surface area, relative to the array thickness. This is because heat transfer, Q, here in the form of dissipation, is directly proportional to the array planar surface area, and inversely proportional to thickness. More succinctly:

$$Q \alpha \frac{WL}{H}$$

where the planar surface area of the array, WL, is the product of the array width and length. Therefore, $$Q \alpha R_A$$

Clearly, the greater the device aspect ratio, the greater the capacity for heat dissipation.

In general, increased heat dissipation leads to increased power-handling capability, and increased device reliability and longevity. Furthermore, it is possible to reduce or eliminate the use of external cooling devices. Existing high power DC-DC power converters, delivering between about 300 watts and 1000 watts, typically have an array aspect ratio of between about 2 and 25, and require forced air convection having a flow rate of about 200–600 linear feet/minute. In contrast, one preferred embodiment of the power conversion array according to invention herein, which provides a comparable power output having an array aspect ratio of at least 60, would use a natural convection flow, or an inherent "chimney effect," without a heat sink, to cool the conversion array.

Figure 9A:
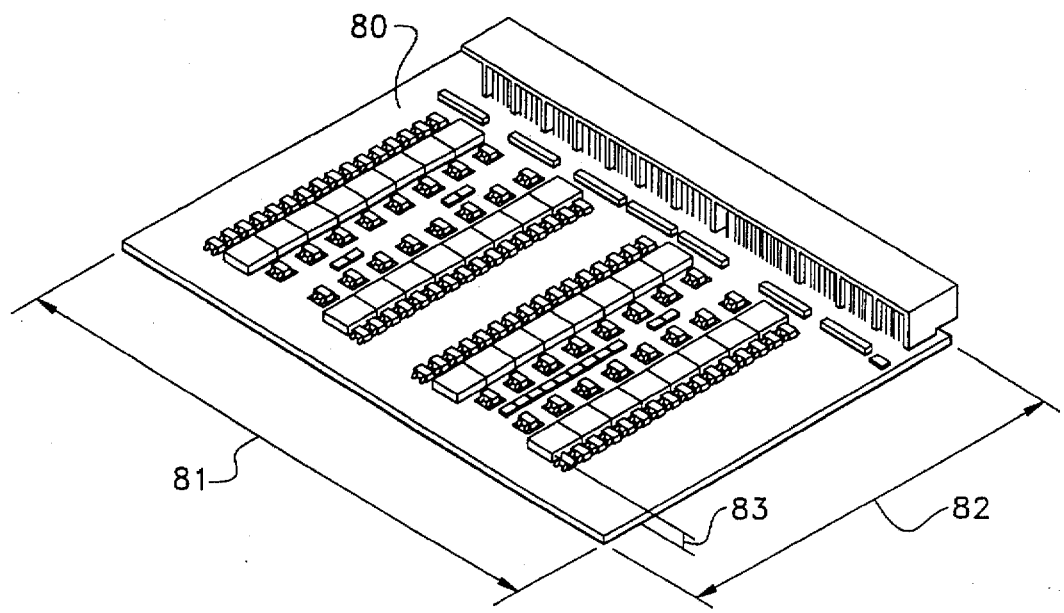
FIG. 9a is an illustration of a perspective view of a power conversion array having a thin-profile configuration.

In general, arrays arranged to have a high array aspect ratio of at least 30 can be used beneficially to provide a nominal power output of, for example, between about 100 watts and 5000 watts, without limitation. Arrays having a high array aspect ratio are capable of delivering high wattage to the primary application. For example, as illustrated in FIG. 9a, where the length 81 of thin-profile array 80 is about 10.8", the width 82 of array 80 is about 10.6", and the thickness 83 of array is about 0.4", the array aspect ratio is about 80. Array 80 can produce a nominal power output signal of about 800 watts.

Figure 9B:
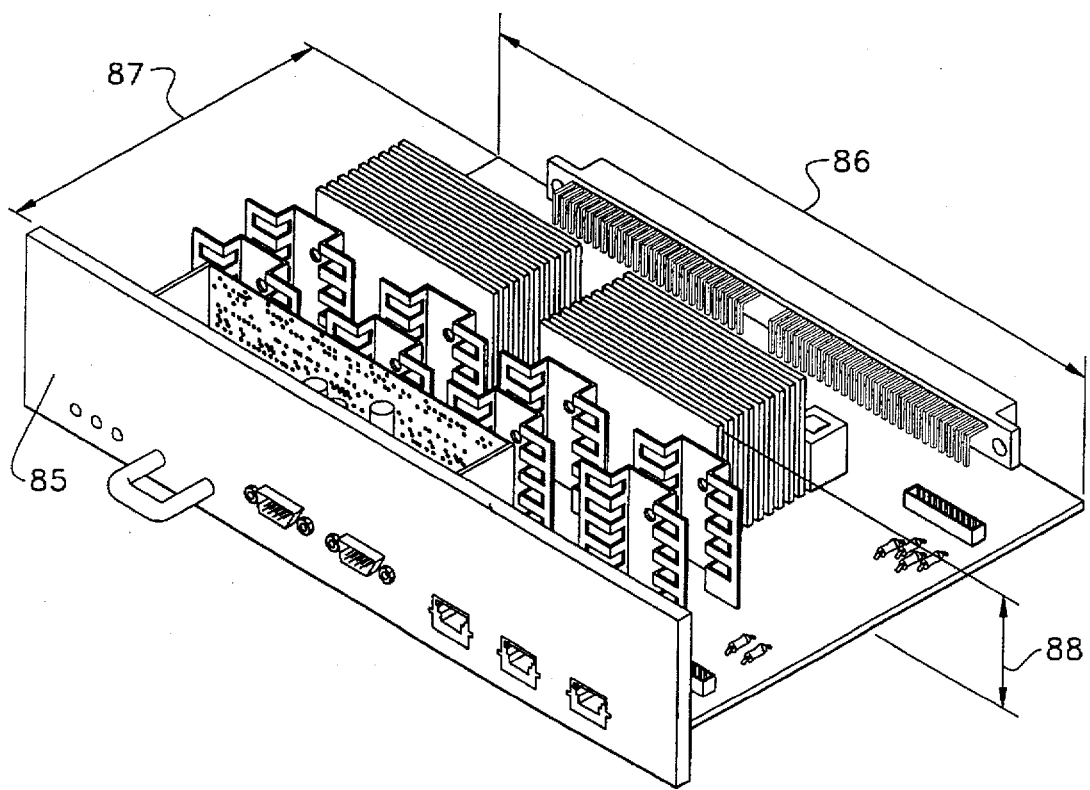
FIG. 9b is an illustration of a perspective view of a conventional power converter.

Many primary applications, including remote sensing and remote signalling devices, may have power requirements on the order of about 300–1000 watts, or more. Using conventional, standard-profile converters, for example, converter 85 in FIG. 9b, substantial space and power resources would be needed, in addition to those required by the primary application, to ensure adequate power converter cooling. By comparison, a primary application using power conversion array 80 in FIG. 9a can employ a high-density, high-power DC-DC converter that produces 800 W in a thin-profile package having an aspect ratio of about 80, preferably without the need for an external cooling system. Therefore, by substantially minimizing or eliminating cooling systems external to the converter array, more space and power can be directed to the primary application. In contrast, the configuration of modern commercial converter 85 in FIG. 9b has a length 86 of about 12.5", a width 87 of about 12.5", and a thickness 88 of about 2.1". Although converter 85 has a dimensionless aspect ratio of about 11.4, it produces about 600 watts. Typically, these converter dimensions would be increased in order to accommodate the components necessary to construct a power supply producing higher power, and the aspect ratio would tend to be even smaller.

Table 1 compares several models of conventional arrays with thin-profile arrays according to the present invention. As used in Table 1 "Qualidyne" represents Qualidyne Systems, San Diego, Calif; "HC Power" represents HC Power Inc., Irvine, Calif; "Vicor" represents Vicor Corp., Andover, Mass.; and "Lambda" represents Lambda Electronics, Inc., Melville, N.Y. Configuration 1 and Configuration 2, as represented in Table 1, are embodiments of the present invention that show a high array aspect ratio of greater than 30.

| Manufacturer | Model | Watts | Width in. | Length in. | Height in. | Array Aspect Ratio |
|---|---|---|---|---|---|---|
| Qualidyne | 21DC01L | 500 | 6.5 | 10 | 5 | 1.89 |
| HC Power | DC10-1 | 1000 | 8 | 11.25 | 5 | 2.35 |
| Vicor | MegaPac | 1600 | 6 | 11.8 | 3.4 | 3.35 |
| Lambda | PFD1005 | 1000 | 8 | 12 | 2.65 | 5.72 |

-continued

| Manufacturer | Model | Watts | Width in. | Length in. | Height in. | Array Aspect Ratio |
|---|---|---|---|---|---|---|
| Vicor | ComPac | 600 | 7.3 | 8.6 | 0.99 | 16 |
| Lambda | PH300F | 300 | 3.4 | 5.8 | 0.5 | 18.4 |
| Config. 1 | Phased-Array 1 | 500 | 8.7 | 10 | 0.4 | 66.6 |
| Config. 2 | Phased-Array 2 | 800 | 10.6 | 10.8 | 0.4 | 80 |

Figure 10:
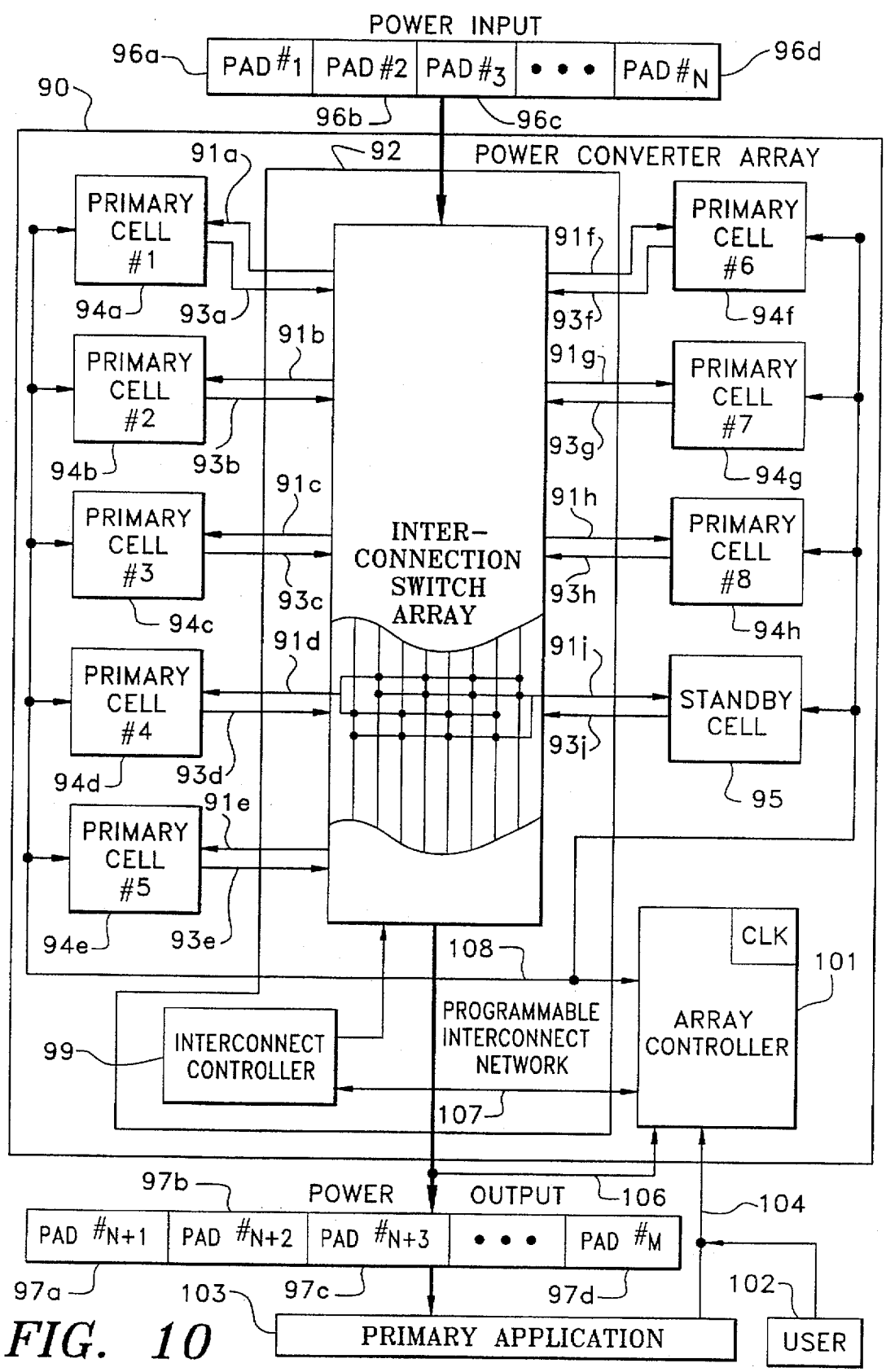
FIG. 10 is a block diagram of a programmable power conversion array according to the invention herein.

In another present embodiment, shown in FIG. 10, it is preferred that power conversion array 90 also include a programmable interconnection network 92 for providing adaptive reconfigurability and adaptive redundancy to the power conversion array architecture. Suitable interconnection networks can be similar to those that are described, for example, in U.S. Pat. No. 5,400,262 to Mohsen (1995), U.S. Pat. No. 5,311,053 to Law et al. (1994), and U.S. Pat. No. 4,949,084 to Schwartz et al. (1990). One skilled in the art would realize that a number of other interconnection schemes also can be used to effect programmable reconfigurability and redundancy. It is preferred that the particular interconnection network configuration employed in network 92 enable any one or more inputs or outputs of converter cells 94a–h, 95, to be selectably connected to one or more of the remaining converter array cells 94a–h, 95, or to array input nodes 96a–d, or array output nodes 97a–d.

In general, interconnection network 92 can include an interconnection switch array 98 and an interconnection switch controller 99. Switch array 98 includes an array of programmable elements 100. Switch controller 99 reconfigures programmable elements 100 in response to signal 107 from the array controller 101. Interconnection network 90 can be formed, for example, on printed circuit boards, substrates including insulators, and thick-film and thick-film hybrids, or an integrated circuit.

In the present embodiment, interconnection network 92 is preferred to be substantially adjacent to, and may be integral with, the power conversion array cells 94a–h, 95 to minimize signal propagation delays, spurious signals, and the like. In addition, although programmable elements 100 can be one-time-programmable elements, it is preferred that elements 100 are capable of being reprogrammed as needed, "on-the-fly", i.e., either during or between the operations of the power conversion array 90. Programmable elements 100 can be, for example, programmable transistor switches or fuse-antifuse switches. When programmable elements 100 are transistor switches, the state of programmable elements 100 can be stored in memory such as, for example, a static RAM, NVRAM, EEPROM, or FLASH memory cell.

The conversion cell array 90 architecture can be reconfigured to meet, or adapt to, a preselected criterion. For example, a power conversion array 90 having a one-time-programmable switch array 98 can be reconfigured to adapt array 90 to a new circumstance in the application environment by the user 102. However, reconfiguration also can be effected semi-autonomously or autonomously, for example, in response to external primary application signal 104. Most preferably, reconfiguration can be an autonomous, adaptive response by conversion array 90 to an adaptation signal 105 from controller 101, to maintain a preselected profile for output power signal 106. The autonomous, adaptive response capability enables the planar cellular conversion array 90 to selectably provide multiple output current and voltage levels, multiple current paths, and fault-tolerance, should one or more cells 94a–h, 95 malfunction. This capability is referred to as dynamically-adaptive reconfigurability and redundancy. Note that each conductive node, such as node 1, 96a, can be connected to any one of the other nodes on array 90 or to the input 91a–c or output 93a–c of any individual cells 94a–h, 95 by programming one or more programmable elements 100.

In general, it is preferred that switch array 90 allows the selective connection of any node 96a–d, 97a–d at essentially random, has no fan-out limitations, and provides bi-directional paths. It is further preferred that any connection between input and output be independent of the interconnection state among other inputs and outputs.

Figure 11:
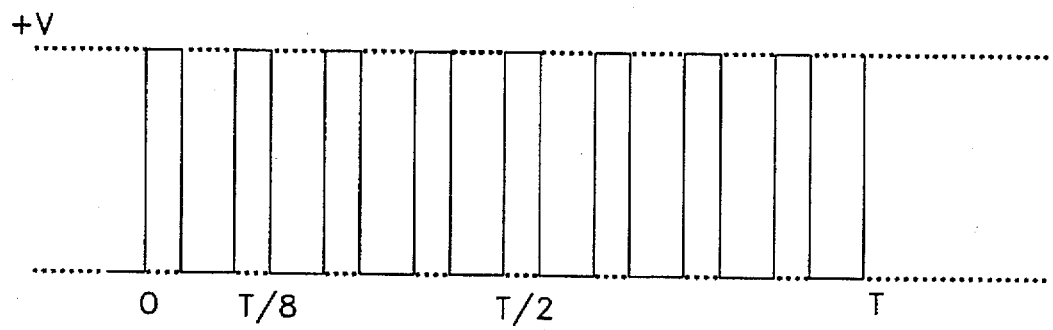
FIG. 11 is an illustration of a switching sequence for a DC-DC power conversion array embodiment of the invention.

FIG. 11 illustrates a switching sequence, or pulse train 115, that can be used to effect power conversion. The pulse train in FIG. 11 can be varied to create a selectable conversion frequency and, thus, a selectable conversion period. In addition to permitting array-wide selectability, the operating frequency to individual conversion cells also can be varied to allow a selectable operating frequency, and period, for each converter cell in the array. As a result, the conversion array and method, according to the invention herein, provide substantial control over the output power signal profile, including output power current and voltage components, output power path, output power waveform and spectrum, and other parameters, as desired.

As shown in FIG. 11, pulse train 115 consists of a sequence of unipolar pulses 102a–h that are substantially uniformly displaced in time. Although pulse amplitude 117 is a preselected voltage (+V), amplitude 117 can be scaled up or down in magnitude, for example, using a transformer. Pulse train 115 then may be low-pass-filtered to substantially remove AC components, thereby producing the desired DC output. In FIG. 11, the period of the conversion frequency is defined over the interval (O,T). Furthermore, the conversion period is divided into eight uniformly displaced subintervals, or phases, each having a period of T/8.

Using conventional converters, the converter output is likely to experience a significant dip in voltage and increased ripple, should any voltage pulse fail to be present, for example, in the event of a particular cell failure. Typically, the solution for this failure would be to provide a filter of increased size. However, under fixed-load conditions, there still would be an increase in the cell current stress level of about 14 percent.

With a reconfigurable array according to the present invention, adaptive redundancy can be implemented by associating one or more primary power cells with at least one standby power cell. In the event of a primary cell failure, the failed cell can be detected, the associated standby cell can be substituted for the failed primary cell which can be disconnected form other functioning cells in the array. It is preferred that the standby power cell be activated at the appropriate phase to minimize the effects of the failed primary cell. Eight primary power cells 941-h can be supported by one standby cell 95, giving "8+1" redundancy. This adaptive redundancy can safeguard the functioning primary cells 94a–h from operating with excessive stress, and can improve the mean-time-before-failure (MTBF) of a typical power cell by as much as 500-fold, where the MTBF-to-replacement-time ratio for the array is at least 1,000. This can lead to a substantial increase in power conversion array reliability and longevity. Furthermore, an alert signal can be triggered by the primary cell failure, so that the failed power cell can be replaced and maximum adaptive redundancy restored, if desired.

The invention is fully applicable in both isolated and non-isolated circuit topologies. Further, it is not necessary that the phase-shift remain constant, but it is within the scope of the invention that the phase shift could be varied on a real-time basis, as a function of, or independently from, variations in the frequency of conversion, depending upon the application at hand and the advantages which are sought.

Figure 12:
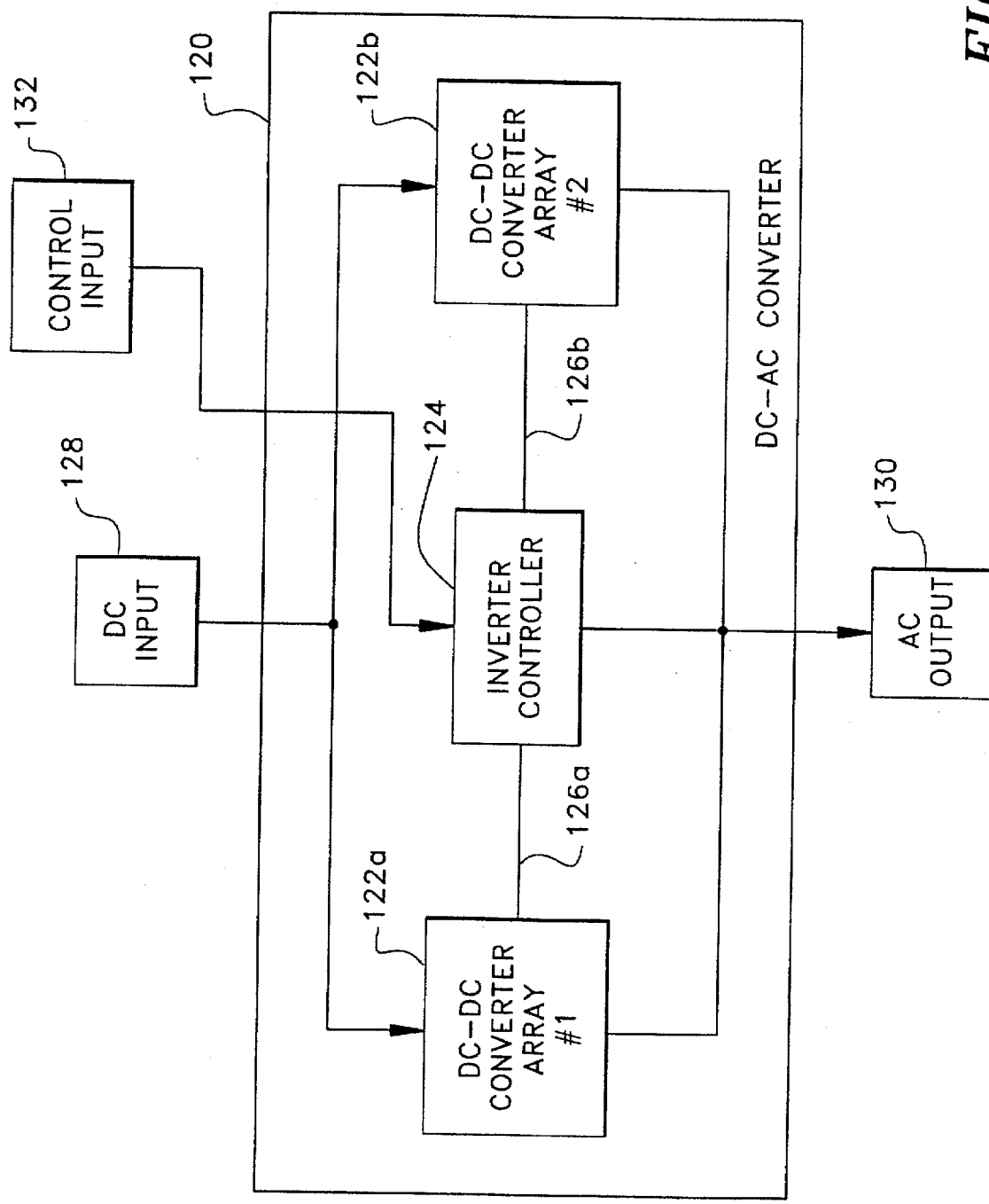
FIG. 12 is a block diagram of a programmable DC-AC power conversion/inversion array embodiment of the invention.

As previously indicated, the invention embodied herein is not limited to DC-DC power conversion. Indeed, a plurality of the previously-described power conversion arrays can be combined to convert a unipolar DC voltage into a continuous train of alternating polarity (AC) voltage wavelengths, capable of delivering energy to a load. FIG. 12 illustrated one such DC-AC inverter 120 which can include, for example, two DC-DC converter arrays 122a,b. Inverter 120 also can include inverter controller 124. Controller 124 provides control signals 126a,b to converters 122a,b respectively, to transform DC input 128 into an AC output 130, according to a preselected output power profile.

Typically, the desired waveform of output 130 is sinusoidal, with little harmonic content. The most commonly-used inverter is the simple square-wave inverter. However, although this simple inverter can provide a good source of energy at the desired fundamental frequency, the harmonic content of the energy can be very high, and can require extensive filtering. It is well-known that selected, symmetrical notching of the inverter input positive and negative half-cycles can significantly reduce the third, fifth, seventh, and even higher, odd harmonics in the inverter output. This notching can be used with inverter 120 to suppress the odd harmonic frequencies in output 130. Selected pulses, for example, the second and seventh pulses of each half-cycle, may be eliminated by inverter controller 124 suppressing the respective pulse generation in converters 122a,b. Because of the modular nature of inverter 120, additional converters 122c,d, can be connected in serial or in parallel, as dictated by the application. Inverter 120 also can be designed to include the aforementioned dynamically adaptive reconfigurability and dynamically adaptive redundancy features at the level of inverter 120, of converters 122a,b, or both. A preselected power output profile thus can be reliably maintained on output 130.

Figure 13:
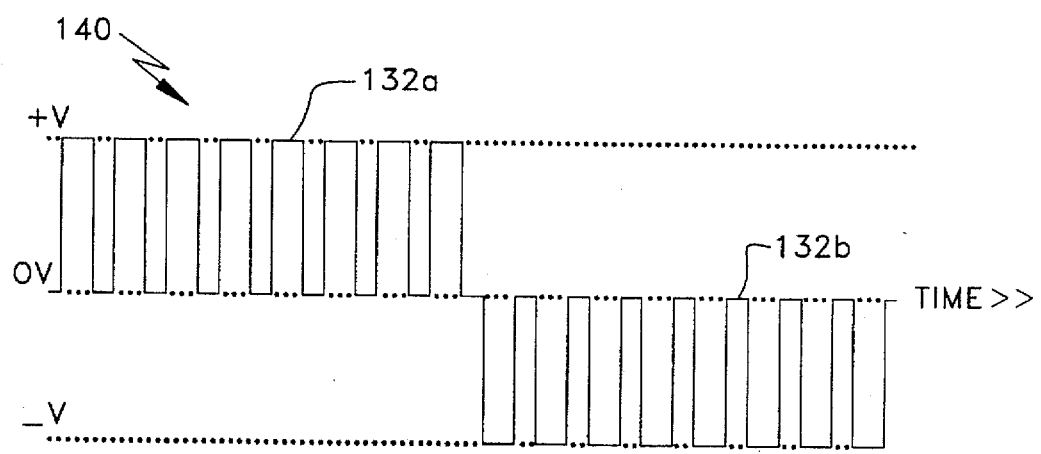
FIG. 13 is an illustration of a switching sequence for a DC-AC power conversion array embodiment of the invention.

FIG. 13 illustrates an exemplary output 140 of DC-AC inverter 120, employing two DC-DC converters 122a,b, synchronized to provide two intermittent, substantially contiguous pulse trains 132a,b having opposite polarity, i.e. a positive half-cycle pulse train 132a, and a negative half-cycle pulse train 132b. Although output 140 in FIG. 13 uses eight half-cycle pulses, this is for illustrative purposes only, and greater or fewer pulses may be used. Selective notching of output 140 could involve the elimination of the second and seventh pulses of each half-cycle. However, the optimization of notching to reduce harmonics may require more than the eight half-cycle pulses depicted in FIG. 13.

The advantages of the invention can now be understood. These advantages include but are not limited to:

1. Reduced converter size for a given power level and operating frequency; equivalently, an increased power density;
2. Optimum thermal characteristics including even heat dissipation, a maximized surface area for a given volume, fewer and cooler hot spots, and reduced requirements for heat sinks;
3. Improved reliability as a result of lower operating temperature, fewer hot spots, and built-in redundancy;
4. Feasibility of fully-automated manufacturing techniques, including surface mount technology, because power is processed in smaller amounts within each converter, therefore, leading to significantly reduced manufacturing costs;
5. Reduction in the number of types of components used, thereby, promoting standardization and lowering overhead costs;
6. Reduction in material content and cost due to more efficient utilization of material and higher volume pricing;
7. Thin-profile converters for use in new applications in which a device aspect ratio of at least about 30 can permit the development of reliable, durable, high-powered aggregate power supplies using multiple, high-density converters;
8. Improved electromagnetic interference characteristics due to distributive nature of EMI sources, reduced ripple voltage, and higher-ripple frequencies, which tend to be easier to filter;
9. Realization of the advantages of high-frequency operation in power converters with few corresponding disadvantages;
10. Utility in wide variety of applications, converter topologies, input voltages, and output voltages;
11. Ease of standardization via standardized power and control elements, or modules, thereby reducing time-to-market, development costs, material costs, and overhead costs, in connection with product introduction;
12. Power capability can be easily scaled in the designs of the invention by varying the number and size of the individual power elements in the individual converter array;
13. Input and output capacitance requirements of the circuits can be reduced by many orders of magnitude, consistent with the teachings of the invention;
14. Reconfigurability of the device architecture is provided, permitting in-the-field modifications of output power profile, including the power output path, by the user or the primary application, or both, for example, during primary application installation or upgrade;
15. Autonomous, on-the-fly, output power profile (current, voltage, and/or power output path) regulation is furnished, thereby tailoring converter array output to the dynamic power requirements of the primary application on demand; and
16. Inherent fault-tolerance in which faulty power cells can be autonomously detected and isolated, and reserve power cells can be substituted, to maintain the desired output power profile, during array operations.

All publications, including patents, mentioned in this specification are indicative of the level of skill in the art to which this invention pertains. All publications are herein incorporated by reference to the same extent as if each individual publication was specifically but individually indicated to be incorporated by reference.

Furthermore, many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. The following claims are, therefore, to be read to include not only the combination of elements which are literally set forth, but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A power conversion array comprising:
   a. an input capacitance;
   b. an output capacitance;
   c. a plurality of converter cells, N in number, each having an input coupled in parallel to the input capacitance and output coupled in parallel to the output capacitance, each of the converter cells for converting an input voltage to an output voltage using switched-mode power conversion, each of said plurality of converter cells operating at an operating frequency having a time period of T, and being phase shifted from each other by a time increment T/N so that each cell is switched on in a time-overlapping relationship with at least one other of the plurality of converter cells, the plurality of converter cells being arranged to provide a thin profile configuration having an aspect ratio of at least 30, wherein each of the plurality of converter cells is switched ON for a time period of $T_{on}$; and
   d. an array controller and a clock, the clock generating a clock signal at the frequency of operation of the plurality of converter cells, the clock being coupled to the array controller, the controller providing a regulated control pulse to a delay circuit for generating a plurality of sequentially-delayed switching pulses and coupled to each of the converter cells to sequentially switch the converters with the switching pulses, whereby input and output current and voltage ripple is substantially reduced, ripple frequency of the array is increased, power capacity is increased, and heat dissipation is substantially increased.

2. A power conversion array comprising:
   a. an input capacitance;
   b. an output capacitance;
   c. a plurality of converter cells each having an input coupled in parallel to the input capacitance and an output coupled in parallel to the output capacitance, each of the converter cells for converting an input voltage to an output voltage using switched-mode power conversion, the plurality of converters operating at a conversion frequency and being phase-shifted across one conversion period so that each converter cell is switched on in a time-overlapping relationship with at least one other of the plurality of converter cells, the plurality of converter cells being arranged in a thin-profile configuration having an aspect ratio of at least 30; and
   d. an array controller and a clock, the clock generating a clock signal at the frequency of operation of the plurality of converter cells, the clock being coupled to the array controller, the controller providing a regulated control pulse to a delay circuit for generating a plurality of sequentially-delayed switching pulses and coupled to each of the converter cells to sequentially switch the converters with the switching pulses, whereby input and output current and voltage ripple is substantially reduced, ripple frequency of the array is increased, power capacity is increased, and heat dissipation is substantially increased.

3. The power conversion array of claim 2 wherein the delay circuit comprises a plurality of delay line modules coupled together in series, each delay line module providing a delayed trigger to initiate a next one of the delay line modules, each delay line module in turn generating a plurality of delayed trigger signals, the delay line modules being coupled to selected ones of the plurality of converter cells to provide the phase-delayed switched-mode operation of the converter cells.

4. The power conversion array of claim 3 wherein the delay line module comprises a multiple-tap delay line circuit and the delay circuit comprises a corresponding plurality of multiple line drivers, each driver being coupled to a corresponding multiple of the converter cells to drive the converter cells ON and OFF in response to the delayed trigger provided to the delay circuit.

5. The power conversion array of claim 2 wherein the regulated control pulse generated by the control circuit is a pulse-width-modulated signal.

6. A method of providing switched-mode power conversion between an input capacitance and output capacitance comprising the steps of:
   a. providing an input power waveform;
   b. sequentially coupling the input power waveform through N switched-mode converter cells coupled in parallel between the input and the output capacitances, the cells being arranged in a thin-profile configuration having an aspect ratio of about 30;
   c. generating a plurality of switching signals through a cascaded delay, and sequentially switching each one of the plurality of switched-mode converter cells with a corresponding sequence of the switching signals, the input power waveform being switched with an operating frequency having a time interval period T and being sequentially coupled through each of the N switched mode converter cells by the resulting predetermined phase shifts of operation of each converter cell within the period at intervals of T/N in an at least partially time overlapping relationship; and
   d. providing an output power waveform from the plurality of converter cells at the output capacitance coupled in parallel with the outputs of the plurality of converter cells, whereby high power operation at high frequency is obtained with substantially increased heat dissipation and without frequency, size, and temperature limitations.

7. A method of providing switched-mode power conversion between an input capacitance and output capacitance, comprising the steps of:
   a. providing an input power waveform;
   b. sequentially coupling input power waveform through N switched-mode converter cells coupled in parallel between the input and output capacitances, the cells being arranged to in a thin-profile configuration having an aspect ratio of about 30;
   c. generating a plurality of switching signals through a cascaded delay, and sequentially switching each one of the plurality of switched-mode converter cells with a corresponding sequence of the switching signals, the input power waveform being switched with an operating frequency having a period and being sequentially coupled in the same sequence to the output capacitance in response to the corresponding sequence of the switching signals through each of the plurality of switched-mode converter cells by the resulting predetermined phase shifts of operation of each converter within the period in an at least partially time-overlapping relationship; and
   d. providing an output power waveform at the output capacitance coupled in parallel with the outputs of the plurality of converter cells, whereby high power operation at high frequency is obtained with substantially increased heat dissipation and without frequency, size and temperature limitations.

8. A power conversion array, comprising:
a. a plurality of array input nodes having an input capacitance;
b. a plurality of array input nodes having an output capacitance; and
c. a plurality of converter cells, N in number, each cell having an input coupled to the input capacitance and an output coupled to the output capacitance, the plurality of converter cells for converting an input voltage to an output voltage using switched-mode power conversion, each of the plurality of converter cells operating at an operating frequency having a period of T, and being phase-shifted from each other by a time increment T/N so that each converter is switched ON in a time-overlapping relationship with a least one other of the plurality of converter cells being reconfigurably connected between a respective one of an array input node and an output of others of the power converter cells, the output of the ones being reconfigurably connected between a respective one of an array output node and an input of the others of the power converter cells,
whereby input and output current and voltage ripple is substantially reduced, ripple frequency of the array increased, and power capacity increased.

9. The power conversion array of claim 8 wherein each of the plurality of converter cells is switched ON for a time period of $T_{on}$.

10. A power conversion array, comprising:
a. a plurality of array input nodes having an input capacitance;
b. a plurality of array output nodes having an output capacitance;
c. a plurality of converter cells each having an input coupled to the input capacitance and an output coupled to the output capacitance, each of the converter cells for converting an input voltage to an output voltage using switched-mode power conversion, the plurality of converter cells operating at a conversion frequency and being selectably phase-shifted across one period of the conversion frequency so that each converter cell is switched on in a time-overlapping relationship with at least one other of the plurality of converters;
d. an array controller and a clock, the clock generating a clock signal at a frequency of operation of each of the plurality of converter cells, the clock circuit being coupled to the control circuit, the control circuit providing a regulated control pulse to a delay circuit for generating a plurality of sequentially-delayed switching pulses and coupled to each of the converter cells to sequentially switch the converter cells with the switching pulses; and
e. a programmable interconnection network, the network selectably connecting each of the plurality of converter cells to one of an adjacent neighboring cells and an array input node and an array output node, the network reconfigurably connecting each cell in one of a serial connection, a parallel connection, and a disconnection, in relation to the respective one of the neighboring cell and the array input node and the array output node,
whereby input and output current and voltage ripple is substantially reduced, the conversion array architecture is reconfigurable, ripple frequency of the array increased, and power capacity increased.

11. The power conversion array of claim 10 wherein the delay circuit comprises a plurality of delay line modules coupled together in series, each delay line module providing a delayed trigger to initiate a next one of the delay line modules, each delay line module in turn generating a plurality of delayed trigger signals, the delay line modules being coupled to selected ones of the plurality of converter cells to provide the phase-delayed switched-mode operation of the converter cells.

12. The power conversion array of claim 11 wherein the delay line module comprises a multiple-tap delay line circuit and the delay circuit comprises a corresponding plurality of multiple line drivers, each driver being coupled to a corresponding multiple of the converter cells to drive the converters ON and OFF in response to the delayed trigger provided to the delay circuit.

13. The power conversion array of claim 10 wherein the regulated control pulse generated by the control circuit is a pulse-width-modulated signal.

14. A method of providing switched mode power conversion between an input capacitance and output capacitance, comprising the steps of;
a. providing an input power waveform;
b. sequentially coupling the input power waveform through N switched-mode converter cells, the cells being reconfigurably coupled between the input and output capacitances;
c. generating a plurality of switching signals through a cascaded delay, and sequentially switching each one of the plurality of switched-mode converters with a corresponding sequence of the switching signals, the input power waveform being switched with an operating frequency having a time interval period T and being sequentially coupled through each of the N switched mode converter cells by the resulting predetermined phase shifts of operation of each converter within said period at intervals of T/N in an at least partially time-overlapping relationship;
d. providing an output power waveform having an output power profile at the output capacitance, the output capacitance being coupled with the outputs of the plurality of converter cells; and
e. reconfiguring the converter cells from a first preselected circuit topology to a second preselected circuit topology, responsive to a preselected output power profile, whereby high power operation at high frequency is obtained according to the preselected output power profile without frequency, size, and temperature limitations.

15. A method of providing switched mode power conversion between an input capacitance and output capacitance, comprising the steps of:
a. providing an input power waveform;
b. sequentially coupling the input power waveform through N switched-mode converter cells, the cells being reconfigurably coupled between the input and output capacitances;
c. generating a plurality of switching signals through a cascaded delay, and sequentially switching each one of the plurality of switched-mode converter cells with a corresponding sequence of the switching signals, the input power waveform being switched with an operating frequency having a period and being sequentially coupled in the same sequence to the output capacitance in response to the corresponding sequence of the switching signals through each of the plurality of switched-mode converter cells by the resulting predetermined phase shifts of operation of each converter within the period in an at least partially time-overlapping relationship;

d. providing an output power waveform having an output power profile at the output capacitance coupled with the outputs of the plurality of converter cells; and e. reconfiguring the converter cells from a first preselected circuit topology to a second preselected circuit topology, responsive to a preselected output power profile, whereby high power operation at high frequency is obtained according to the preselected output power profile without frequency, size, and temperature limitations.

* * * * *